Figure 1:
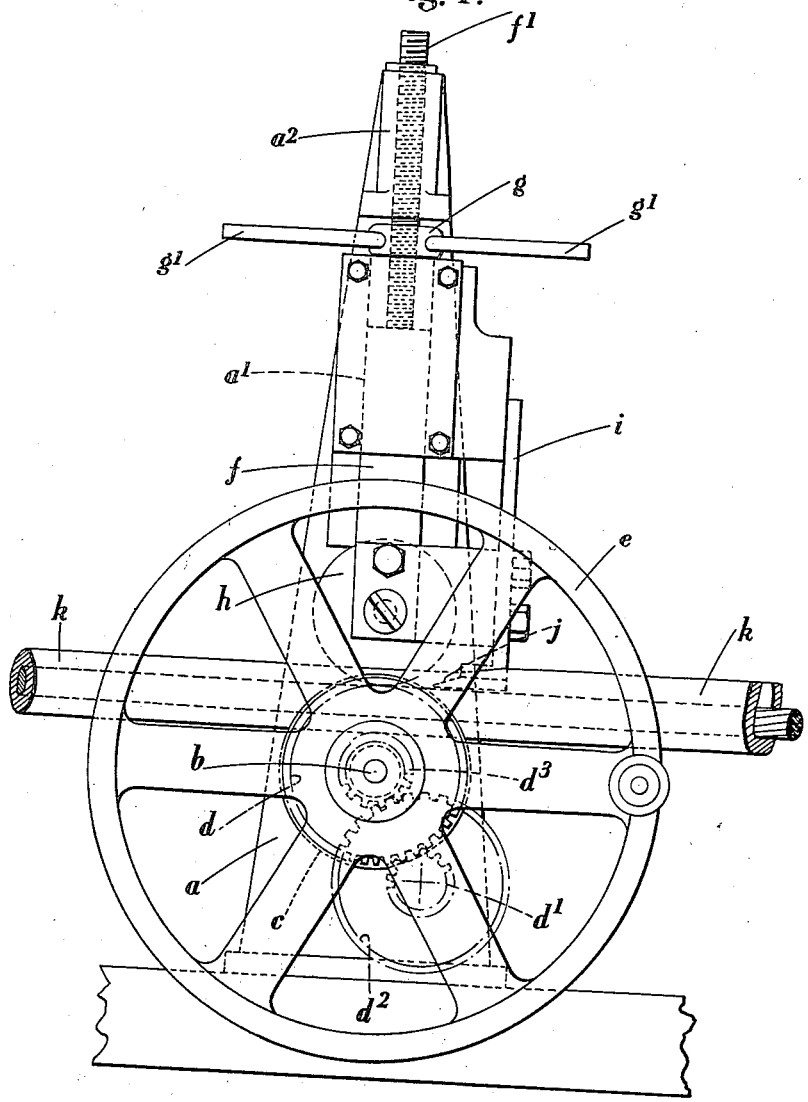

Nov. 16, 1937.    C. P. SECKHAM    2,099,084
APPARATUS FOR STRIPPING ELECTRIC CABLES
Filed Sept. 29, 1934    2 Sheets-Sheet 1

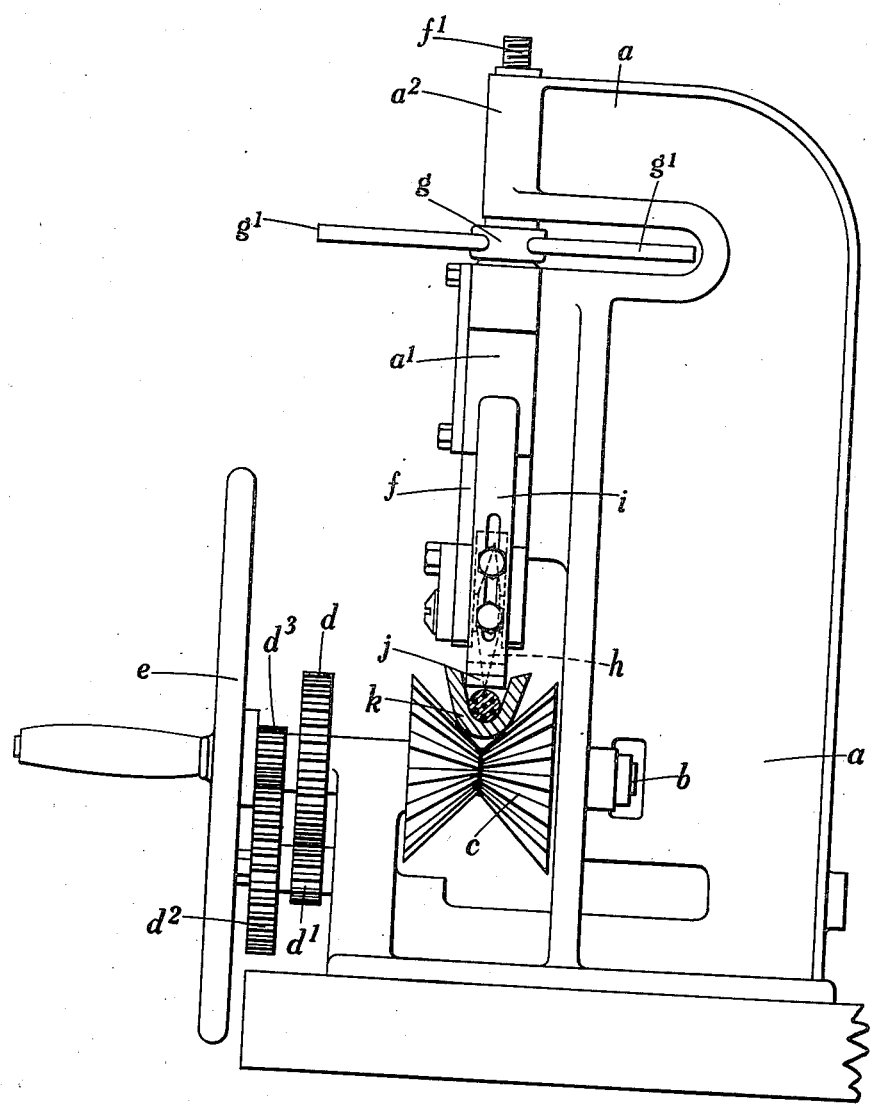

Patented Nov. 16, 1937

2,099,084

UNITED STATES PATENT OFFICE 2,099,084

APPARATUS FOR STRIPPING ELECTRIC CABLES

Charles Percy Seckham, Wakefield, England

Application September 29, 1934, Serial No. 746,261
In Great Britain October 19, 1933

5 Claims. (Cl. 164—61)

The invention relates to apparatus for enabling the sheathing of lead-covered, paper-insulated or rubber-insulated cables to be cut or slit, so that the lead sheathing and copper conductors can be recovered.

There have, I am aware, been machines for the purpose referred to, but they have been costly and have required considerable adjustment to enable different diameters of cable to be operated upon.

The object of my invention is to provide a simple and cheap machine or apparatus in which lead-covered, paper-insulated or rubber-insulated cable of any diameter can be dealt with, and which necessitates a minimum of adjustment when a change is made from one diameter of cable to another.

A machine according to the invention comprises a suitable support or frame in which there is journalled a serrated feed roller of V form, the spindle of which may be adapted to be rotated manually either directly or through gearing, or which may be driven by power if preferred.

Above the feed roller there is provided a vertically movable spindle or block capable of adjustment towards and away from the feed roller by means of a screw and hand wheel, the spindle being threaded and the hand wheel constituting a rotatable nut restrained from vertical movement.

The lower end of the spindle or block carries a cutter disc, which is mounted to rotate loosely on a spindle extending parallel to and vertically above that of the feed roller.

A plough member may be provided adjacent the delivery side of the feed roller and cutter, for the purpose of opening out the slit insulation and facilitating its removal from the core.

In the accompanying drawings,

Fig. 1 is a front elevation; and

Fig. 2 a side elevation of a cable stripping machine according to the invention.

Referring to the drawings, $a$ represents a suitable form of pillar bracket in which there is journalled a spindle $b$ carrying a V-shaped roller $c$ the surface of which is serrated so that it will function to grip the surface of a cable and, as the roller is rotated, feed the cable forward.

A toothed gear $d$ on the spindle $b$ meshes with a pinion $d'$, and a gear wheel $d^2$ fast with the pinion $d'$ meshes with a pinion $d^3$ loose on the spindle $b$ and associated with a hand wheel $e$. In place of being driven through gearing as shown, the spindle $b$ may carry the hand wheel, or it may be arranged to drive the spindle from a suitable source of power.

Movable vertically in a guide $a'$ above the feed roller $c$ is a block $f$, the said block having a screw $f'$ which passes through a nut member $g$ restrained from vertical movement by being located between the guide $a'$ and an overhanging guide $a^2$ for the upper end of the screw. The nut member $g$ is shown as having radial spokes $g'$ to enable it to be rotated.

In the lower end of the block $f$ there is mounted, to rotate freely on a horizontal axis, a cutter disc $h$ which is disposed vertically above the centre of the feed roller $c$.

Adjustably secured to the block $f$ so as to move vertically therewith is a bracket $i$ the lower end of which is furnished with a substantially V-shaped plough member $j$.

When a piece of cable $k$ is to be operated upon, the cutter block $f$ is adjusted to the correct height to admit of the end of the cable being introduced beneath the cutter and between the latter and the feed roller. The cutter block is then screwed down, and the feed roller turned sufficiently to traverse the cable a short distance until the cutter has sunk in sufficiently to penetrate through the lead and/or insulation or sheathing.

When the cutter has been sunk in to the required depth, the feed roller is rotated in a direction to cause the cable to be traversed beneath the cutter, during which movement the sheathing or insulation of the cable is slit longitudinally by the cutter which is caused to rotate by its frictional pressure against the cable.

As the cable, after having had its insulation or sheathing slit up, is traversed forward, the plough member $j$ enters between the slit edges and functions to spread or open them out, and thus facilitates the removal of the insulation of sheathing from the core of the cable.

As the cutter member $h$ is not driven positively, the construction of the machine is kept very simple, and as the position of the cutter block is adjustable vertically by rotation of the nut member $g$ the adjustment of the apparatus to suit different diameters of cables is a very simple matter.

If desired, the feed roller $c$ may be provided with a cutter disc at the base of its V groove, so that as the cable is traversed it will be slit at two diametrically opposite points, and the cutter disc $h$ may be disposed at the base of the groove of a V-shaped serrated roller, so as to increase the grip on the cable. These two modifications just mentioned are really, however, only of value when cable of the same diameter is likely to be operated upon. In both cases an alteration in the diameter of cable and/or thickness of insulation and/or diameter of core would necessitate a change in both the top and bottom cutter members.

Suitable means may be provided for guiding the cable as it is being slit, a convenient arrangement being to provide a V-shaped longitudinal trough on the approach side of the feed roll or on both sides of the same. Figures 1 and 2 illustrate the spreader member J as being wedge-shaped so that the pointed or entrant end of such member J will enter the cut made by the cutter h. The width of the rear end of the wedge member J is very substantial, as shown in Figure 2, so as to spread the covering or casing of the cable wide open to substantially a distance equal to the diameter of the cable. Thus the cable can be readily removed from its casing k. The cutter h presents a V-shaped cutting edge to the casing k of the cable so that it will spread the cable casing slightly to admit the entrant point or end of the wedge member J to further spread the cable casing k. Except for the wedge member J it would be necessary to spread the cable casing k with the fingers in order to remove the cable therefrom. It would not be possible to provide a cutter h which would sever the cable casing and spread it to the requisite degree to admit of ready removal of the cable from the casing k.

Having thus described my invention, what I claim as new and desire to secure by Letters Patent is:—

1. A cable stripping machine comprising in combination, a cutter member, a work sustaining member arranged in opposition to the cutter and between which and the cutter the work is adapted to be forced, separate carriers for said cutter and work sustaining members, means for adjusting at least one of said carriers toward and from the other, and a spreader member carried by said adjustable carrier and disposed in the path of the severed portion of the work as it leaves the cutter member for spreading the same, said spreader member being adjustable relative to the cutter member and said spreader member being wedge-shaped and having a pointed entrant end and a flared rear end whereby the latter will spread the cable covering to substantially expose the cable therein which is to be removed.

2. A cable stripping machine comprising in combination, a cutter member, a work sustaining member arranged in opposition to the cutter and between which and the cutter the work is adapted to be forced, a spreader for the severed part of the work and arranged to engage the same as it leaves the cutter, and means for adjusting said spreader toward and from the work relative to the depth of the cut and said spreader member being wedge-shaped and having a pointed entrant end and a flared rear end whereby the latter will spread the cable covering to substantially expose the cable therein which is to be removed.

3. A cable stripping machine comprising in combination, a cutter member, a work sustaining member arranged in opposition to the cutter and between which and the cutter the work is adapted to be forced, a spreader for the severed part of the work arranged to engage the same as it leaves the cutter, and a single means for vertically adjusting both cutter and spreader for cuts of different depths, and means for adjusting the spreader vertically relative to the cutter and said spreader member being wedge-shaped and having a pointed entrant end and a flared rear end whereby the latter will spread the cable covering to substantially expose the cable therein which is to be removed.

4. A cable stripping machine comprising in combination, a cutter member, a work sustaining member arranged in opposition to the cutter and between which and the cutter the work is adapted to be forced, separate carriers for said cutter and work sustaining members, means for adjusting at least one of said carriers toward and from the other, a spreader member carried by said adjustable carrier and disposed in the path of the severed portion of the work as it leaves the cutter member for spreading the same, a single means for vertically adjusting both cutter and spreader for cuts of different depths, and means for adjusting the spreader relative to the cutter and said spreader member being wedge-shaped and having a pointed entrant end and a flared rear end whereby the latter will spread the cable covering to substantially expose the cable therein which is to be removed.

5. In a machine for stripping the cover from a cable comprising in combination a cutter member, a work sustaining member arranged in opposition to the cutter and between which and the cutter the work is adapted to be forced, separate carriers for said cutter and work sustaining members, means for adjusting at least one of said carriers toward and from the other, a spreader member carried by said adjustable carrier said spreader member being wedge-shaped and having a pointed entrant end and a laterally flared rear end approximately of a width equal to the diameter of the cable, the pointed end of said spreader member being disposed rearwardly of the cutter and aligned with the cut in the covering of the cable whereby to spread the same and permit the cable to be taken out without the necessity of spreading the cable covering with the fingers.

CHARLES P. SECKHAM.